(12) United States Patent
Jallad et al.

(10) Patent No.: US 7,624,440 B2
(45) Date of Patent: Nov. 24, 2009

(54) SYSTEMS AND METHODS FOR SECURELY PROVIDING AND/OR ACCESSING INFORMATION

(75) Inventors: Ramsey Jallad, The Woodlands, TX (US); Patrick Stach, The Woodlands, TX (US); John Terrill, Jersey City, NJ (US)

(73) Assignee: EMT LLC, New York, NY (US)

( * ) Notice: Subject to any disclaimer, the term of this patent is extended or adjusted under 35 U.S.C. 154(b) by 0 days.

(21) Appl. No.: 11/830,891

(22) Filed: Jul. 31, 2007

(65) Prior Publication Data

US 2008/0034210 A1    Feb. 7, 2008

Related U.S. Application Data

(60) Provisional application No. 60/821,065, filed on Aug. 1, 2006.

(51) Int. Cl.
| | |
|---|---|
| G06F 7/04 | (2006.01) |
| G06F 17/30 | (2006.01) |
| G06F 21/00 | (2006.01) |
| H04L 29/06 | (2006.01) |
| G06F 11/30 | (2006.01) |
| G06F 21/24 | (2006.01) |

(52) U.S. Cl. .............. 726/16; 726/19; 726/27; 726/30; 713/164; 713/182
(58) Field of Classification Search .............. 726/16
See application file for complete search history.

(56) References Cited

U.S. PATENT DOCUMENTS

| 6,212,635 B1 | 4/2001 | Reardon |
| 6,480,963 B1 | 11/2002 | Tachibana |
| 6,697,944 B1 | 2/2004 | Jones et al. |
| 2005/0193188 A1* | 9/2005 | Huang ........................... 713/1 |

(Continued)

FOREIGN PATENT DOCUMENTS

WO  WO 2004081792 A1 * 9/2004

OTHER PUBLICATIONS

Richard Ta-Min, Lionel Litty, David Lie, "Splitting interfaces: making trust between applications and operating systems configurable", Nov. 2006, OSDI '06: Proceedings of the 7th symposium on Operating systems design and implementation, Publisher: USENIX Association, pp. 279-292.*

(Continued)

*Primary Examiner*—Matthew B Smithers
*Assistant Examiner*—Courtney D Fields

(57) ABSTRACT

The invention is directed to a secure data communication system and method for use in connection with a potentially untrusted host computer. The system includes a storage medium that is connectable with the potentially untrusted host computer. The system also includes a hardened, stand alone, browser stored on the storage medium. The system can also include client authentication data and/or add-on program data. The browser can use the client authentication data to facilitate secure communications. The system can include has a loader that performs an integrity check of the browser and/or data files and launches the browser only if the browser and associated data files pass the integrity check. The client authentication data can be stored on the storage medium. The storage medium can be read-only, read-write or a combination thereof.

41 Claims, 4 Drawing Sheets

U.S. PATENT DOCUMENTS

| | | | |
|---|---|---|---|
| 2006/0136748 A1 | 6/2006 | Bade et al. | |
| 2006/0294381 A1 | 12/2006 | Mitchell et al. | |
| 2007/0067620 A1 | 3/2007 | Jevans | |
| 2007/0136579 A1 | 6/2007 | Levy et al. | |
| 2007/0204153 A1* | 8/2007 | Tome et al. | 713/164 |

OTHER PUBLICATIONS

Jun. 4, 2004—Firefox Portable Support—http://portableapps.com/support/firefox_portable#cd.

Dec. 12, 2005—Firefox R-Kiosk—https://addons.mozilla.org/en-US/firefox/addon/1659.

Aug. 3, 2005—Symbio Technologies' Intern Releases Firefox Kiosk Extension—http://www.opensourceexperts.com/PressRelease/showDetail.html?itemid=27.

Jun. 16, 2006—Concepts Against Man-in-the-Browser Attacks, Philip Guhring—http://www.it-observer.com/pdf/dl/concepts_against_mitb_attacks.pdf.

Dec. 13, 2006—CAcert Wiki SecureBrowser—http://wiki.cacert.org/wiki/SecureBrowser.

Mar. 15, 2005—Crypto-Gram Mar. 2005 Newsletter, Bruce Schneier—http://www.schneier.com/crypto-gram-0503.html#2.

Jul. 10, 2006- Oct. 3, 2006—http://blog.washingtonpost.com/securityfix/2006/07/citibank_phish_spoofs_2factor_1.html.

Jan. 7 2006—http://www.betanews.com/article/ICQ_Others_Back_New_U3_USB_Standard/1105064565.

Dec. 18, 2005—http://www.petri.co.il/configure_usb_disks_to_be_read_only_in_xp_sp2.htm.

Jun. 14 2007 - http://www.secure idnews.com/news/2007/06/14/id-tool-togo-combines-convenience-with-multifactor-authentication/.

May 15, 2007—http://www.insurancenewsnet.com/article.asp?n=1&neID=20070515290.2_52c0002765183001.

Apr. 13, 2005 UNC Payst Blog Posting—Firefox Kiosk—http://www.unc.edu/~payst/?p=2.

* cited by examiner

US 7,624,440 B2

SYSTEMS AND METHODS FOR SECURELY PROVIDING AND/OR ACCESSING INFORMATION

CROSS-REFERENCED TO RELATED APPLICATIONS

The present application claims priority of U.S. Provisional Patent Application Ser. No. 60/821,065, filed Aug. 1, 2006, the entire contents of which are incorporated herein by reference.

FIELD OF THE INVENTION

The present application is directed to systems and methods for providing secure access to information available via a computer network. More specifically, without limitation, the present application relates to computer-based systems and methods for securely providing and accessing information in a networked computer environment.

BACKGROUND OF THE INVENTION

The Internet is a global network of connected computer networks Over the last several years, the Internet has grown in significant measure. A large number of computers on the Internet provide information in various forms. Anyone with a computer connected to the Internet can potentially tap into this vast pool of information.

The most wide spread method of providing information over the Internet is via the World Wide Web (the Web). The Web consists of a subset of the computers connected to the Internet; the computers in this subset run HTTP servers ("Web servers"). Web servers host information in the form of Web pages. Collectively the server and the information hosted are referred to as a Web site. A significant number of Web pages are encoded using the Hypertext Markup Language ("HTML"). Other markup language encodings are possible for example Standard Generalized Markup Language ("SGML"), eXtensible Markup Language ("XML") and Extensible HyperText Markup Language ("XHTML"). Interactive and/or animated Web sites can be encoded using Dynamic HTML ("DHTML"). This type of encoding often utilizes a collection of technologies such as a static markup language (such as HTML), a client-side scripting language (such as JavaScript), a presentation definition language (Cascading Style Sheets or CSS), and the Document Object Model. Web pages in these formatting languages may include links to other Web pages on the same Web site. Web pages may be generated dynamically by a server by integrating a variety of elements into a formatted page prior to transmission to a Web client as is well known in the art. In general, Web servers, and information servers of other types, await requests for information from Internet clients.

Client software has evolved that allows users of computers connected to the Internet to access this information. Advanced browser clients such as Netscape NAVIGATOR, INTERNET EXPLORER (Microsoft), FIREFOX (Mozilla), SAFARI (Apple), and OPERA (Opera Software ASA) allow users to access software provided via a variety of information servers in a unified client environment. Typically, such client software is referred to as a browser.

The foregoing information regarding the Internet and World Wide Web is provided as background with respect to Web-based embodiments of the systems and methods described herein. As such, the present invention is not necessarily limited to such embodiments but may encompass other delivery vehicles/communication channels now known or subsequently discovered.

In recent years common problems facing electronic communication via computer networks in, but not limited to, the banking industry have include identity theft, information leakage and accurate auditing. The present application describes a solution to these problems and provides a next generation approach towards client to business and business to business communication.

BRIEF SUMMARY OF THE INVENTION

The invention is directed to a secure data communication system and method for use in connection with a potentially untrusted host computer. The system includes a storage medium that is connectable with the potentially untrusted host computer. The system also includes a hardened, stand alone, browser stored on the storage medium. The system can also include client authentication data, wherein the browser uses the client authentication data to facilitate secure communications. The system can include a loader that performs an integrity check of at least one file associated with the browser and launches the browser only if the file passes the integrity check.

The client authentication data can be stored on the storage medium. N this case, the loader can perform an integrity check of at least a portion of the client authentication data and launch the browser only if the client authentication data passes the integrity check. The system can also include add-on program data stored on the storage medium. In this case, the loader can perform an integrity check of at least one file associated with the add-on program data and launch the browser only if the file passes the integrity check. The system can also include an input for receiving client authentication data (e.g., username/password).

The system can utilize a variety of storage media such as a USB Flash Drive, CD or DVD. The storage medium can have a read only portion or a read/write portion or both a read only portion and a read/write portion. The loader can be stored on the read only portion and perform an integrity check of at least one file associated with the browser, The loader can then launch the browser only if the file passes the integrity check. The browser can also be stored on the read only portion.

The loader can launch the browser in debug mode. This utilizes the debug handle and prevents other programs from debugging the browser software components. Client authentication data can include at least one digital certificate. In some cases, the digital certificate is cryptographically signed. The browser can be hardened by limiting communication to a list of browsable addresses. The browser can also be hardened by forcing encrypted communication. The browser can also be hardened by forcing mutual authentication. The browser can also be further hardened by preventing access to security related browser options.

BRIEF DESCRIPTION OF THE DRAWINGS

For a better understanding of the present invention, reference is made to the following description and accompanying drawings, while the scope of the invention is set forth in the appended claims:

DETAILED DESCRIPTION OF THE INVENTION

I. System Overview

Figure 1:
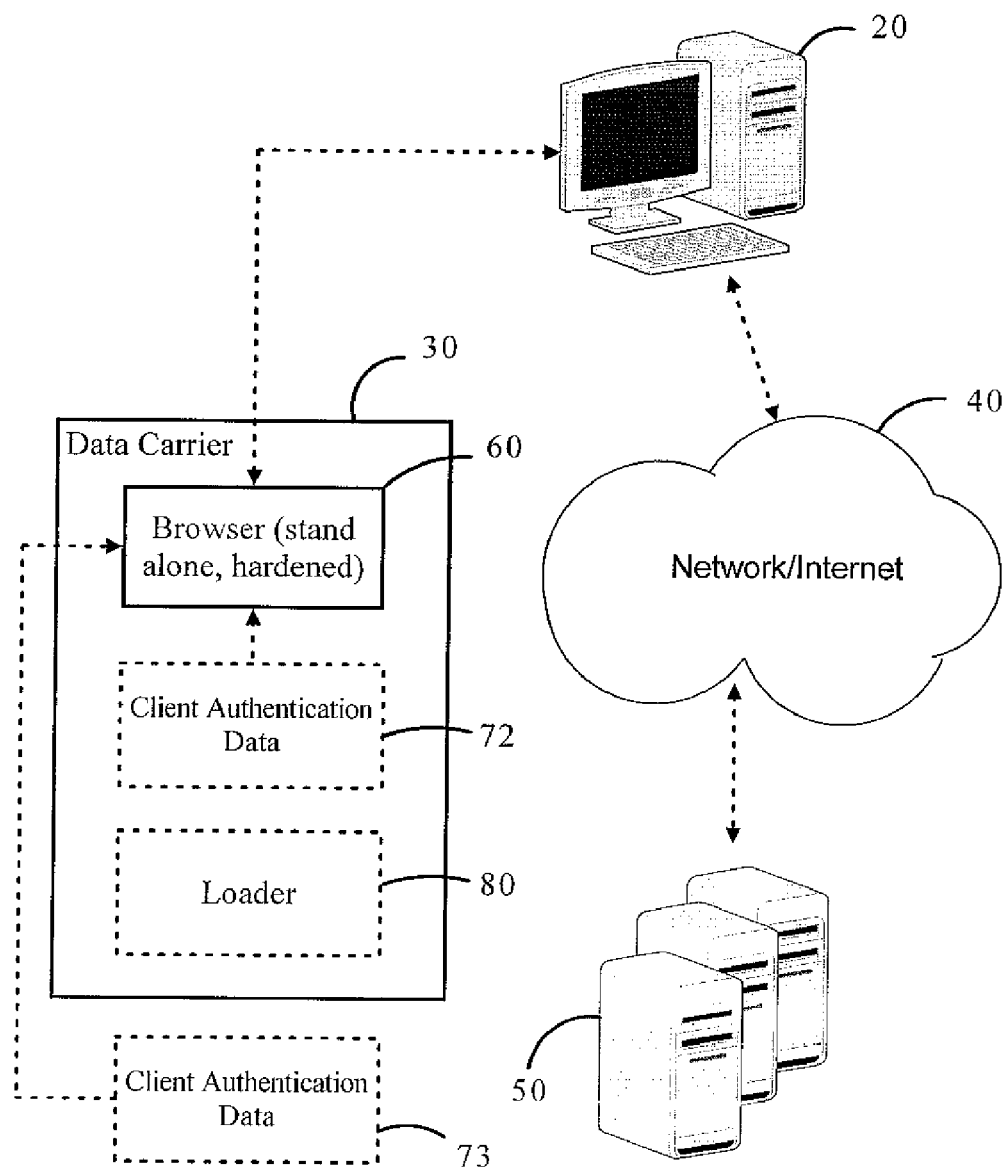
FIG. 1 shows and exemplary system diagram in accordance with the invention.

The present application is directed to systems and methods for securely providing and/or accessing information via a computer network. These methods can be implemented as systems using the exemplary hardware and/or software described below, potentially using any of the technologies described in the background section above. More particularly, one or more processing elements are programmed or adapted to perform the information provision/access functionality. Such one or more processing elements communicate with a system data store that stores the data associated with that functionality. In addition, or instead, such methods can be encoded as a series of software instructions on any suitable combination computer readable media including without limitation read-only memory, magnetic media and/or optical media. The foregoing general description and the following detailed description are exemplary and explanatory only and do not restrict the scope of the inventions disclosed herein.

Referring to the drawings, like numbers indicate like parts throughout the views as used in the description herein, the meaning of "a "an," and "the" includes plural reference unless the context clearly dictates otherwise. Also, as used in the description herein, the meaning of "in" includes both "in" and "on" unless the context clearly dictates otherwise. Also, as used in the description herein, the meanings of "and" and "or" include both the conjunctive and disjunctive and may be used interchangeably unless the context clearly dictates otherwise.

FIG. 1 shows and exemplary system diagram in accordance with the invention. In this example, the system has a data carrier 30 loaded with a secure data viewer or browser 60. The data carrier 30 can be coupled to a host computer 20. The removable nature of the data carrier provides the capability of up to two factor authentication, in that a user can be required to have i) a cryptographically unique and valid token (e.g., digital certificate) and ii) a user based authentication such as a username and password combination to access the browser 60. A variety of data carriers are suitable for use with the invention. Typical data carriers include USB Flash Drives, CD discs, DVD discs and the like. It is understood that a wide variety of data carriers can be used without departing from the scope of the invention. In an typical, operation of the system requires either coupling the USB flash drive into an available host computer USB port or inserting the CD/DVD into an appropriate host computer drive. A secure data viewer is then auto-run without installing or modifying software on the client system.

Host computers suitable for use in accordance with the invention are available from a variety of sources that are well known in the art (e.g., Apple, Dell, Gateway, Hewlett Packard/Compaq, Palm and the like). Host computer 20 is generally shown as a desktop unit however it is understood that other devices could be used for example, notebook computers, PDA's, Cell Phones and the like. Host computer 20 can include typical hardware including a display and input devices (e.g., keyboard, mouse, touch screen . . . ) I/O ports (USB, IEEE 1394 . . . ) and the like. It is understood that the invention can be implemented utilizing one or more of a variety of computing environments (e.g., MICROSOFT WINDOWS family, APPLE MAC OS X, LINUX, PALM OS, and the like).

Host computer 20 is coupled to a network 40 (e.g., the Internet, LAN, WAN and the like). One or more remote computers or servers 50 are also coupled to the network 40 operable to communicate with host computer 20. The connection between host computer 20, servers 50 and network 40 can be carried out using conventional techniques (e.g., wired, wireless, dialup, broadband . . . ) as is well known in the art.

Host computer 20 typically includes an operating system and may include a web browser installed on the host computer hard drive. In the case of MICROSOFT products, INTERNET EXPLORER is installed along with the WINDOWS operating system. It is understood that installation not only copies the operating system and browser software to the host computer hard drive, it also includes a variety of data entries in the WINDOWS registry. The registry is a database that stores settings and options for the operating system and applications. The registry is flexible in its implementation and enables a wide range of applications in the WINDOWS environment. However, current installation mechanisms also produce system vulnerabilities. A typical web browser installed in this fashion is vulnerable for a number of reasons. For example, malware (e.g., computer virus, worm, trojan, spyware or the like) can potentially modify any of the operating system or browser files since the files reside on the host computer hard drive. Similarly, malware can also modify registry entries. This can result in the unintended loading of add-on program data (e.g., plugins, browser helper objects and the like). In general, add-on programs interact with the operating system or browser and can add additional (sometime unintended) functionality. Many add-on programs are loaded upon system or application (e.g., browser) startup and can compromise system security (e.g., key loggers, screen capture malware and the like). For these reasons and others, the host computer is generally referred to herein as potentially untrusted.

In order to address security issues associated with a potentially untrusted host computer. The system utilizes a removable data carrier. Data carrier 30 generally includes a stand alone, hardened browser 60 that enables data communication between host computer 20 and the network 40. As noted above, typical data carriers for use in accordance with the invention include USB Flash Drives, CD discs, DVD discs and the like. The browser 60 will also access client authentication data 72, 73 as discussed in more detail below. The data carrier can also include a loader 80 that initiates startup of the invention.

In operation, a user will typically insert the data carrier into the host computer as discussed above. The browser is launched and run in stand-alone mode. In one embodiment, installation of browser 60 is not required. Browser 60 is hardened to eliminate many potential security risks. Loader 80 may also initiate the startup process and further enhance system, security. Browser 60 can access client authentication data 72 and/or 73 prior to initiating secure communications with a web site via network 40. In an alternative embodiment, the application and certification information can be installed on a stand-alone computer workstation. Varying levels of first factor security can be achieved through limited physical access to the workstation. This first factor security can be used alone or in combination with second factor user-based security such as via a username/password combination. In general, the browser has been modified to enable it to run off of read-only mediums, prevent interaction with system configuration settings, and enforce communications standards. Thus the term "stand alone" as it is used herein refers to the running of an application with at least some isolation between other processes and system resources, settings or the like and is not limited to application running from a single media.

Authentication

A common problem with electronic communications is authentication. The invention addresses this problem by using security modules which have been reviewed and certified by various compliance boards. These modules can be utilized to provide multi factor authentication.

Multi-factor authentication refers to using multiple independent schemes to authenticate users. In one embodiment of the invention, a read-only medium is loaded with a stand alone, hardened, browser and one or more digital certificates. Physical possession of the read only medium (or token) is required to authenticate. Another example is to require a unique username and password combination in order to access the browser, thus requiring something the user knows. A higher degree of complexity is presented to an attacker of a system where multiple authentication mechanisms are required before authorization is granted to a system.

Secure Sockets Layer

SSL or the Secure Sockets Layer is a standard for establishing and negotiating a cryptographically secure connection. One embodiment of the invention can be configured to allow SSL version 2, SSL version 3, and/or TLS traffic, thus enabling it to communicate to any server that supports the Secure Sockets Layer.

Certificate Based

Digital Certificates can be used by the invention and by the server or servers to which it connects. The certificates are cryptographically signed so that the server can identify that the browser is validly issued and so that the browser can verify the authenticity of the server. The server can, in some implementations, also maintain a list of revoked certificates and verify that a previously signed client certificate has not been revoked. This provides a mechanism for disabling lost or stolen tokens.

Password Based

Username and password combinations can be used to provide a non-physical authentication mechanism. This is a standard authentication scheme used by many applications.

Limited View Point

One embodiment of invention can be constructed to only allow connections to a specific range of servers and only servers that it can authenticate. This provides a limited view point to the client that is applicable to performing authorized actions with their viewer to the correct server.

Phishing

Phishing is defined as the act of falsely claiming to be an established legitimate enterprise in an attempt to scan the user into surrendering private information that is later used for identity theft. Commonly this is done by sending forged email or by obtaining misspellings of the legitimate domain. For example topbank.com is the legitimate site, a phisher registers tpobank in the event users switch the 'o' and the 'p'. When users attempt to log in, their information surreptitiously is logged before they are forwarded to the legitimate site. In the majority of cases, the user is unaware that their personal information has been compromised.

In on embodiment, the invention addresses the problem by automatically starting on a designated starting page, without user intervention. This browser can also be configured to prohibit browsing of external sites, even if one is manually entered by the user or a link is present. Further, when combined with the previously mentioned Certificate authentication scheme, the browser then has the capability to prevent loading unauthorized content, even from the allowed server or servers.

Cross-Site Scripting

Cross-site Scripting is a class of web application vulnerability that allows a malicious user to control the content that is presented to a legitimate user. For example, if a web application fails to remove HTML markups from web input, a malicious user can insert JavaScript that modifies the destination of a username and password submission, thus capturing the username and password.

In one embodiment, the invention addresses this problem by not allowing the user to browse to external sites through both the limited scope of what sites can be loaded and that the server is authenticated by the client. Thus if a malicious user were to exploit a Cross-site Scripting vulnerability, data could not be leaked to an untrusted system.

Man in the Middle Attacks

In cryptography, a Man In the Middle attack is an attack in which an attacker is able to read, insert and modify at will, messages between two parties without either party knowing that the link between them has been compromised. In one embodiment, the invention addresses this problem by utilizing the previously mentioned Certificate scheme, thus the client verifies the authenticity of the sewer and vice versa.

Information Storage

In an exemplary implementation, the invention is based on a Mozilla source tree, however such an implementation can be modified to disallow caching of information it retrieves. This is done to prevent leakage of previously viewed information. In another embodiment, the browser can be modified to disable saving or printing of data.

Single Sign-On

The invention allows the server side components from existing Web Applications to be reused. Further, because of the standardized viewer and its known version and behavior, a reliable Single Sign-On Portal can be easily constructed. The end resultant is that applications and their data is entirely controlled on the server side, thus it can be tracked and updated asynchronous of the user base. The integration of existing Web Applications through the secure data viewer provides a secure transport for existing applications, lowers end-user training time, and reutilization of infrastructure.

Zero End-User Configuration

The invention requires no configuration for the end due to its auto-run nature. Upon connection of the data carrier, the browser loads and connects to the designated server without user interaction. In one embodiment, all connections must be verified mathematically by the digital certificate stored on the data carrier, thus preventing the end-user from unintentionally or accidentally connecting to a third web servers.

II. Exemplary System Variations

Figure 2A:
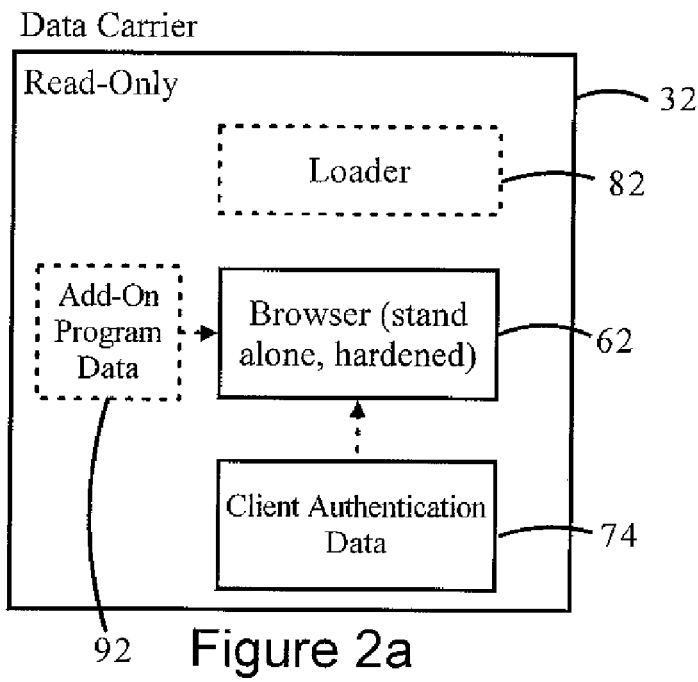
FIG. 2a shows a system implementation with a read only data carrier in accordance with the invention.

As outlined above, the system can be implemented with several variations. For example, the system can be implemented with a read only data carrier as shown in FIG. 2a. In this example, read only data carrier 32 includes a stand alone, hardened browser 62 and client authentication data 74 stored on the read only data carrier 32. Client authentication data 74 can include one or more digital certificates uniquely associated with a specific user. Browser 62 can then ensure that all connections are verified mathematically using one or more digital certificate packaged with browser, thus preventing the end-user from unintentionally or accidentally connecting to an authorized third web servers. The system can also include add-on program data as shown by block 92. Typical add-on program data can include applications such as SHOCK-WAVE and ACROBAT READER (Adobe) and/or other applications that may be required to communicate with a remote server. The system can also include a loader 82 as discussed in more detail below.

Figure 2B:
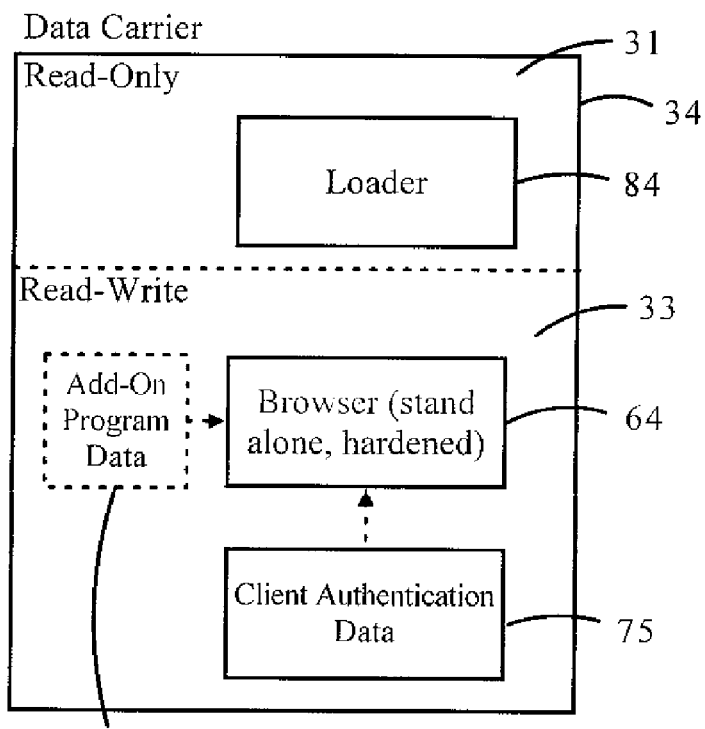
FIG. 2b shows a system implementation with a data carrier having both read only and read-write portions in accordance with the invention.

The system can also be implemented with a data carrier having both read only and read-write portions as shown in FIG. 2*b*. In this example, data carrier 34 has a read-only portion 31 and a read-write portion 33. A stand alone, hardened browser 64 and client authentication data 75 are stored on the read-write portion 33 of data carrier 34. A loader 84 is stored on the read-only portion 31 of data carrier 34. In this example, the loader 84 is used to initiate system operation. The loader can perform a variety of functions and is discussed in more detail below. In general, the loader will i) check its own integrity, ii) verify the integrity of the files associated with browser 64 and the client authentication data 75, iii) check for the presence of key logging software, iv) launch the browser 64 in debug mode and v) place appropriate hooks to prevent screen captures. Browser 64 can then ensure that all connections are verified mathematically using one or more digital certificate packaged with browser, thus preventing the end-user from unintentionally or accidentally connecting to an authorized third web servers. Based on these examples other variations are readily apparent. The system can also include add-on program data as shown by block 94. Typical add-on program data can include applications such as SHOCKWAVE and ACROBAT READER (Adobe) and/or other applications that may be required to communicate with a remote server.

III. Stand Alone, Hardened Browser

The system uses a stand alone, hardened browser. As is well known in the art, a typical state of the art web browser cannot be run in standalone mode. Accordingly, the invention is implemented with a modified web browser. The following example details the appropriate modifications for web browser based on a Mozilla based browser set up for stand alone operation on a read-only data carrier as shown in FIG. 2*a*. It is understood that a subset of these modifications can be utilized to implement a system on data carriers having read-write portions.

Build Configuration Options

The following configure script parameters are passed at build time:

enable-application=browser
 enable-crypto
 enable-default-toolkit=windows
 disable-calendar
 disable-static-mail
 disable-ldap
 enable-single-profile
 disable-profilelocking
 disable-profilesharing
 disable-necko-disk-cache
 disable-debug
 disable-logging
 disable-composer
 disable-view-source
 enable-plaintext-editor-only
 disable-installer
 disable-tests
 disable-mailnews
 disable-updater Of these configuration options the ones to note are:

1) enable-application=browser prevents the browser from containing the mail/news reader, html editor, calendar and chat features.

2) enable-single-profile prevents browser from attempting to create another profile if an instance is already running.

3) disable-profilelocking prevents the browser from attempting to create lock files (as it uses a created file in the profile directory instead of traditional filesystem discretionary locking).

4) disable-profilesharing prevents the browser from attempting to create a browser instance list file.

5) disable-necko-disk-cache prevents the browser from building in Necko Disk Cache, which serves as the browser's disk based caching system.

6) disable-debug prevents the browser from attempting to write a debug logfile.

7) disable-logging prevents the browser from attempting to write a logfile.

8) disable-installer prevents the browser from building in the installer subsystem. This is the traditional Windows installer system that Mozilla uses.

9) disable-updater prevents the browser from attempting to update itself and write to files on the read-only filesystem.

10) disable-tests prevents the browser from building in the unit tests which ship per default with Mozilla as most of the test harnesses require writing to disk.

Filesystem—Profile

Figure 3:
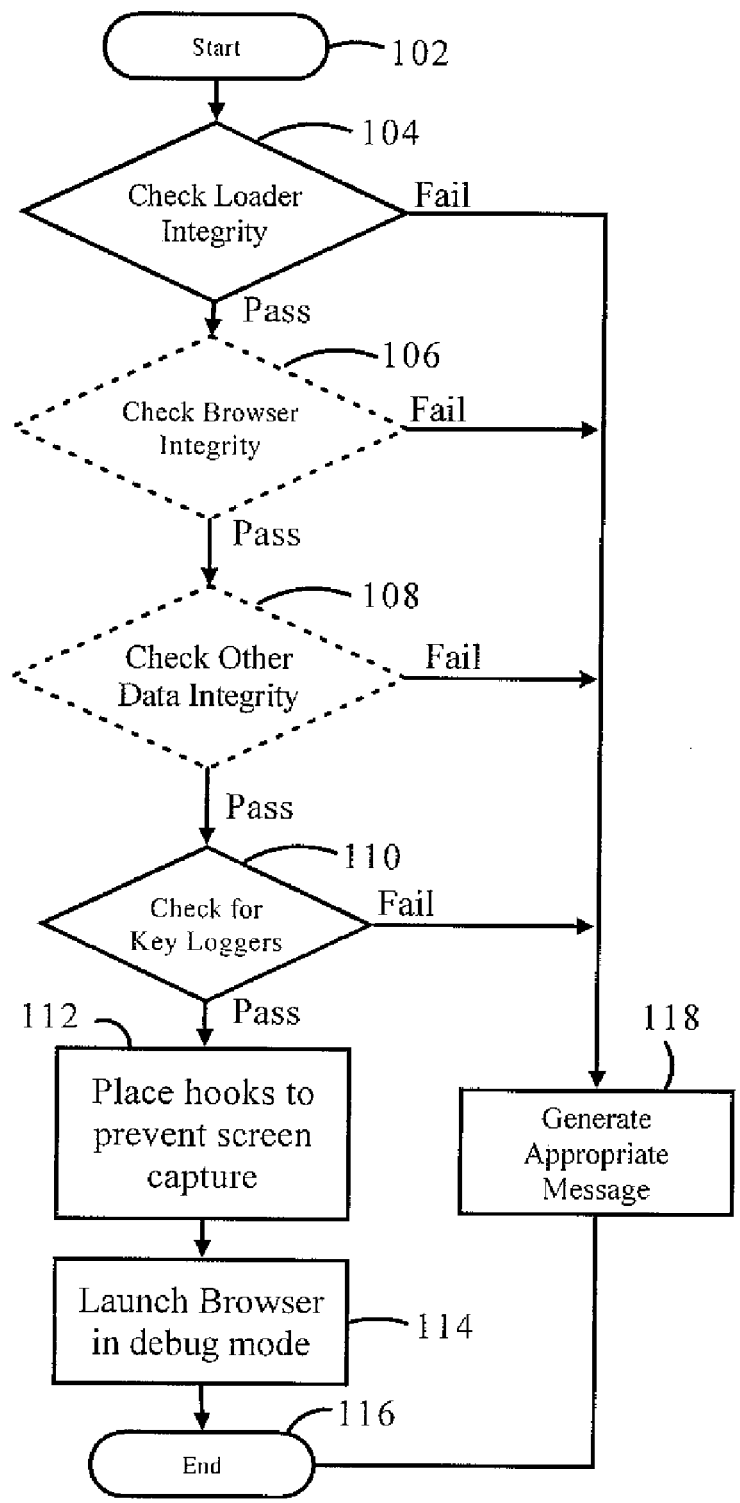
FIG. 3 is a flowchart showing exemplary loader functionality in accordance with the invention.

In a typical implementation the browser is run from the loader (see e.g., FIG. 3, reference number 84). The browser binary's entry point function is found in the file mozilla\browser\app\nsBrowserApp.cpp. In the main function code is added to determine the path of the binary itself. Then the directory is checked to determine if it is $_i$driveletter$l$:\dist\bin. If so then environment variables XRE_PROFILE_PATH and XRE_PROFILE_LOCAL_PATH to $_i$driveletter$l$:\data. Further the environment variable MOZ_PLUGIN_PATH should be set to $_i$driveletter$l$:\plugins to prevent plugins from being loaded from system directories.

Filesystem—SQLite

Mozilla embeds SQLite 3 for managing various profile settings, such as certificates. This however attempts to open the databases as read-write, which must be disabled. The file mozilla\db\sqlite3\os_win.c implements SQLite's filesystem abstraction layer.

1) Modifications to the "sqlite3WinOpenReadWrite" function: i) the variable h is initialized to INVALID_HANDLE_VALUE; ii) the call to CreateFileW with the FILE_SHARE_WRITE flag is commented out, iii) the call to CreateFileA with the FILE_SHARE_WRITE flag is commented out. These modifications prevent the browser from needing to open profile related databases with write abilities.

2). Modifications to the "sqlite3WinOpenExclusive" function: i) the call to CreateFileW—GENERIC_WRITE flag is removed, ii) the call to CreateFileA—GENERIC_WRITE flag is removed. These modifications prevent the browser from needing to open profile related databases with write capabilities.

3) Modifications to the "sqlite3WinTempFileName" function: a line must be added to the top of the function to return SQLITE_NOMEM. This prevents the browser from leaving temporary files on the system.

4) Modifications to the "winWrite" function: a line must be added to the top of the function to return SQLITE_OK. This prevents the browser from needing a writeable filesystem.

5) Modifications to the "winTruncate" function: a line must be added to the top of the function to return SQLITE_OK. This prevents the browser from needing a writeable filesystem.

Filesystem—NSPR

The NSPR, or Netscape Security Provider, Service handles the workings of SSL, certificates, and password management. This service, however, requires writable disk space per the default Mozilla build. The file mozilla\nsprpub\pr\src\md\windows\ntio.c implements NSPR's filesystem abstraction layer.

1) Modifications to the "_PR_MD_OPEN" and "_PR_MD_OPEN_FILE" functions: the flags variable must be checked for the CREATE_ALWAYS, CREATE_NEW, and GENERIC_WRITE flags and return MAGIC_HANDLE which is defined as 0x33331111. This prevents the browser from needing a writeable disk space and as such it can "emulate" writeable disk space.

2) Modifications to the "_PR_MD_READ" function: the variable fd must be checked to match MAGIC_HANDLE. If fd matches MAGIC_HANDLE the function returns −1. This indicates to the browser that the fake file is opened and that no more data is available in the file.

3) Modifications to the "_PR_MD_WRITE" function: the variable fd must be checked to match MAGIC_HANDLE. If fd matches MAGIC_HANDLE the function returns the value of parameter len. This indicates to the browser the fake file is opened and it returns as if the file had been written to.

4) Modifications to the "_PR_MD_LSEEK" and "_PR_MD_LSEEK64" functions: the variable fd must be checked to match MAGIC_HANDLE. If fd matches MAGIC_HANDLE the function returns the value of parameter whence. This indicates to the browser the fake file is opened and it returns as if the file position had been changed.

5) Modifications to the "_PR_MD_CLOSE" function: the variable fd must be checked to match MAGIC_HANDLE. If fd matches MAGIC_HANDLE the function must return void. This indicates to the browser the fake file is opened and that it should not actually close the file.

6) Modifications to the "_PR_MD_DELETE" function: a line must be added to the top of the function to return 0. This prevents the browser from deleting files from system disks.

7) Modifications to the "_PR_MD_RENAME" function: a line must be added to the top if the function to return 0. This prevents the browser from renaming files on system disks.

8) Modifications to the "_PR_MD_MAKE_DIR" function: a line must be added to the top to return 0. This prevents the browser from creating directories.

9) Modifications to the "_PR_MD_RMDIR" function: a line must be added to the top to return 0. This prevents the browser from removing directories.

Filesystem—XPCOM

The file xpcom\io\nsWinAPIs.cpp implements XPCOM's filesystem abstraction layer.

1) Modifications to the "nsCreateDirectoryW" function: a line must be added to the top of the function to return ERROR_SUCCESS. This prevents the browser from creating directories.

2) Modifications to the "nsCreateFileW" function: code must be added to the top to return MAGIC_HANDLE, which is defined as 0x33331111, when any of the CREATE_ALWAYS, CREATE_NEW, and the GENERIC_WRITE flags are set. This prevents the browser from writing files or the need for writeable filesystem space.

3) Modifications to the "nsCopyFileW" function: a line must be added to the top of the function to return ERROR_SUCCESS. This prevents the browser from creating files.

4) Modifications to the "nsMoveFileW" function: a line must be added to the top of the function to return ERROR_SUCCESS. This prevents the browser from moving files on the filesystem.

Registry

The default Mozilla source tree requires the local operating system's registry to operate. Mozilla uses the registry to control system wide settings, such as default browsers, store preferences, and locate plugins. Registry access however is required to locate system specific information, such as system library locations, and as such it cannot be entirely removed. This section outlines the changes associated with registry calls of Mozilla in order to prevent creation or deletion of registry keys and prevent reading possibly malicious registry keys.

Registry—Preferences

Some of the Shell service modifications can be done by editing mozilla\browser\app\profile\firefox.js. The following lines of mozilla\browser\app\profile\firefox.js must be changed from:

pref("browser.shell.checkDefaultBrowser", true);
pref("profile.allow_automigration", true);

To:

pref("browser.shell.checkDefaultBrowser", false);
pref("profile.allow_automigration", false);

Registry—Shell Service

The implementation of the Windows Shell service is located at mozilla\browser\components\shell\src\ nsWindowsShellService.cpp.

1) Modifications to the "nsWindowsShellService::SetDefaultBrowserVista" function: a line should be added at the top of the function to return PR_TRUE. This prevents the browser from being set as the default browser when running on Windows Vista.

2) Modifications to the "nsWindowsShellService::SetDefaultBrowser" function: a line should be added at the top of the function to return NS_OK. This prevents the browser from being set as the default browser.

3) Modifications to the "nsWindowsShellService::DeleteRegKeyDefaultValue" function: the call to RegOpenKeyEx should be modified to open for read access and the call to RegDeleteValue should be removed. This prevents the browser from modifying registry key values and returns the appropriate error code when a registry key fails to exist. This prevents the modification of registry values.

4) Modifications to the "nsWindowsShellService::DeleteRegKey" function: code must be added above the call to RegOpenKeyEx to determine if the key exists, then return success if they key exists else return an error. This prevents the deletion of registry values.

5) Modifications to the "nsWindowsShellService::SetRegKey" function: code must be added at the top of the function to return immediately when called. This prevents modification of registry values.

6) Modifications to the "sWindowsShellService::GetShouldCheckDefaultBrowser" function: code must be added to the top of the function to set the value at the address contained in aResult to PR_FALSE and then immediately return NS_OK. This prevents the browser from checking if it is the default system browser.

7) Modifications to the "WriteBitmap" function: a line should be added at the top of the function to return NS_OK. This prevents the browser from disclosing window pixel data.

8) Modifications to the "nsWindowsShellService::SetDesktopBackground" function: a line should be added at the top of the function to return NS_OK. This prevents the browser from modifying the system background image settings.

9) Modifications to the "nsWindowsShellService::SetDesktopBackgroundColor" function: a line should be added at the top of the function to return NS_OK. This prevents the browser from modifying the system background image settings.

10) Modifications to the "nsWindowsShellService::GetUnreadMailCount" function: a line should be added after the *aCount=0 line to return NS_OK. This prevents the browser from interacting with the possibly compromised default mail program.

11) Modifications to the "nsWindowsShellService::GetMailAccountKey" function: a line should be added at the top of the function to return PR_FALSE. This prevents the browser from interacting with the possibly compromised default mail program.

Registry—Plugin Service Provider

The implementation of the Windows Plugin Service Provider is located in mozilla\modules\plugin\base\src\nsPluginDirServiceProvider.cpp.

1) Modifications to the "nsPluginDirServiceProvider::GetFile" function: a line must be added after the initialization of variables to return NS_ERROR_FAILURE. This prevents the browser from utilizing system installed plugins which may be vulnerable to security problems.

2) Modifications to the "nsPluginDirServiceProvider::GetPLIDDirectories" function: a line must be added after the initialization of variables to return NS_ERROR_FAILURE. This prevents the browser from utilizing system installed plugins which may be vulnerable to security problems.

Registry—XPCOM Registry Service

The inclusion and initialization of the XPCOM Registry Service is located in xpcom\build\nsXPComInit.cpp. The line COMPONENT(WINDOWSREGKEY, nsWindowsRegKeyConstructor) must be commented out to remove the Windows Registry XPCOM component. The GRE XPCOM glue provides the XPCOM component access to the Gecko Runtime Environment and is implemented in mozilla\xpcom\glue\nsGREGlue.cpp.

1) Modifications to the "GRE_GetGREPathWithProperties" function: code should be added to the top of the function to set the memory pointed to by aBuffer to nsnull and return NS_OK. This prevents the browser from using the system installed Gecko Runtime Environment.

Registry—4.5XPFE Service

The XPFE Service provides the capability to restart Mozilla to the same state when a reboot is performed. This is implemented in mozilla\xpfe\bootstrap\nsNativeAppSupportWin.cpp.

1) Modifications to the "nsNativeAppSupportWin::CheckConsole" function: the block of code that checks if Mozilla was started from the registry and with the—turbo flag should be commented out. This prevents the browser from disclosing or having its state manipulated.

2) Modifications to the "deleteKey" function: a line should be added to the top of the function to return ERROR_SUCCESS. This prevents the browser from altering any registry keys created by possibly installed instances of Mozilla.

3) Modifications to the "nsNativeAppSupportWin::EnsureProfile" function: a line should be added to the top of the function to return NS_OK. This prevents the browser from registering itself as the default DDE handler for the system.

The XPFE Service also contains a set of utility functions for interfacing the

Windows registry. This is implemented in mozilla\xpfe\components\winhooks\nsWindowsHooksUtil.cpp.

1) Modifications to the "RegistryEntry::set" function: a line must be added to the top of the function to return NS_OK. This prevents the browser from modifying the host registry.

2) Modifications to the "setWindowsXP" function: a line must be added to the top of the function to return. This prevents the browser from being set as the default system browser.

3) Modifications to the "RegistryEntry::reset" function: a line must be added to the top of the function to return NS_OK. This prevents the browser from setting the default system browser to Internet Explorer.

4) Modifications to the "deleteKey" function: a line must be added to the top of the function to return ERROR_SUCCESS. This prevents the browser from deleting registry keys on the host machine.

5) Modifications to the "FileTypeRegistryEntry::set" function: a line should be added to the top of the function to return NS_OK. This prevents the browser from altering the system default handler applications.

6) Modifications to the "FileTypeRegistryEntry::reset" function: a line should be added to the top of the function to return NS_OK. This prevents the browser from altering the system default handler applications.

7) Modifications to the "EditableFileTypeRegistryEntry::set" function: a line should be added to the top of the function to return NS_OK. This prevents the browser from entering into edit mode.

Limiting Browsable Address Space

Figure 2C:
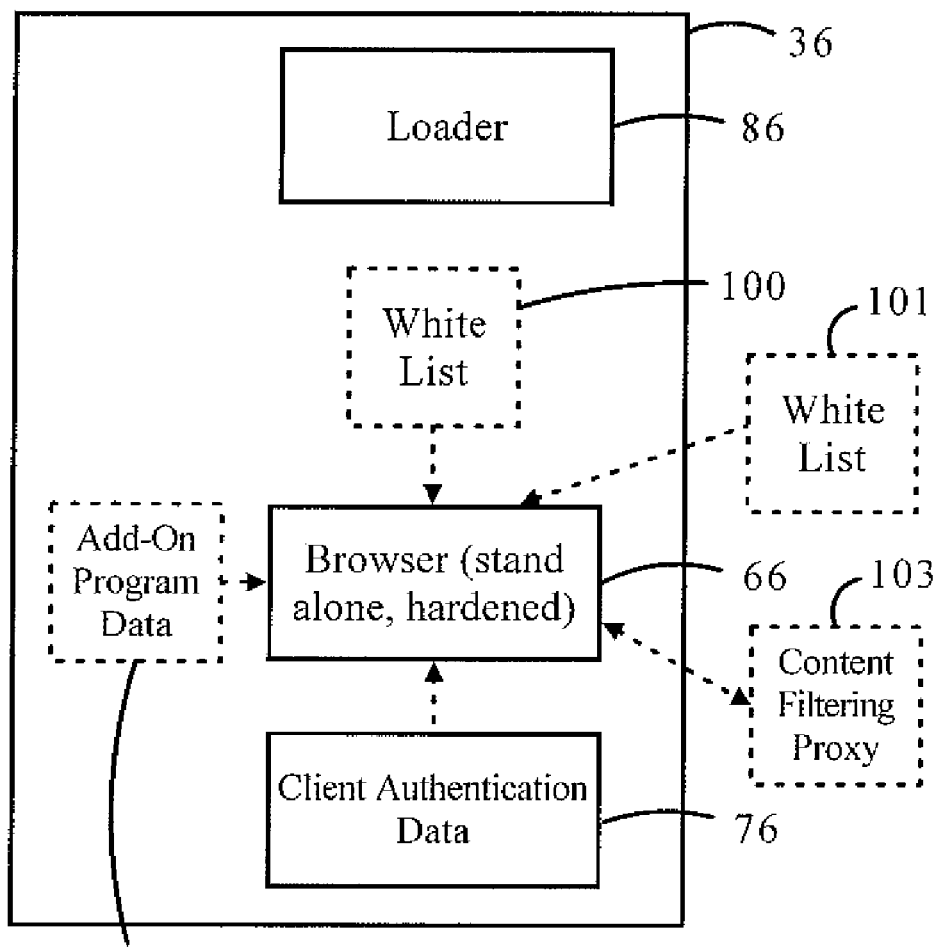
FIG. 2c shows a system implementation with a browser configured with a white list to limit the browsable address space in accordance with the invention.

The browser can be modified to limit communication to a list of browsable addresses. This can be accomplished by utilizing a list of browsable addresses with which the browser will allow communication (e.g., a white list). FIG. 2c shows a system implementation with a browser 66 configured with a white list 100, 101 in accordance with the invention. The white list can be populated with a general list of browsable addresses or a specific list of browsable addresses associated with a particular user. The white list can be stored locally as shown by block 100 or remotely as shown by block 101. The system can also utilize both a locally stored white list and a remotely stored white list. In this event, the local white list 100 can include a link to the URL or address of the remotely stored white list 101. In keeping with the example above, a person of skill in the art can modify the URI handler function of the Mozilla browser to implement a white list based on the disclosure contained herein.

It is understood that once the browser 66 begins communication with a browsable address listed in the white list, a portion of the data necessary to render the desired web page may come from addresses (e.g., $3^{rd}$ party web sites) that are not contained in the white list. A typical example of such $3^{rd}$ party data includes content from a vendor web site, image data or the like. However, it may be desirable to allow the user to receive some or all of this data. To this end, the invention can route such $3^{rd}$ party data to a content filtering proxy 103 as is known in the art. The content filtering proxy 103 can then pass the $3^{rd}$ party data, modify the $3^{rd}$ party data or deny access to the $3^{rd}$ party data based on previously defined filtering criteria. In keeping with the example above, a person of skill in the art can modify the URI handler function of the Mozilla browser to implement a white list and to communicate with a content filtering proxy based on the disclosure contained herein.

Forcing Encrypted Communication

The browser can be modified to required encrypted communication between the browser and a remote server. In keeping with the example above, this can be accomplished by modifying the Mozilla URI handler to require an SSL connection. In the event the remote server does not support SSL, the browser can decline to establish communications.

Forcing Mutual Authentication

The browser can be modified to require mutual authentication between the browser and a remote server. In keeping with the example above, this can be accomplished by modifying the Mozilla HTTP protocol handler to require mutual authentication.

Preventing Access to Security Related Browser Options

The browser can be modified to preventing access to security related browser options. For example, the Mozilla browser utilizes XML User Interface Language (XUL) to maintain toolbars, menu functions and associated hot keys and the like. The appropriate XML file(s) can be modified to remove the desired security related browser options from the browser menu. The associated hot keys can be disable as well. This prevents user access security related options that are accessible via toolbars, menus, hotkeys and the like.

IV Loader

FIG. 3 is a flowchart showing exemplary loader functionality in accordance with the invention. It is understood that the flowcharts contained herein are illustrative only and that other program entry and exit points, time out functions, error checking routines and the like (not shown) would normally be implemented in typical system software. It is also understood that system software my run continuously (i.e., it may run in the background) after being launched. Accordingly, any beginning and ending blocks (e.g., 102, 116) are intended to indicate logical beginning and ending points of a portion of code that can be integrated into a main program and called as needed. Implementation of these aspects of the invention is readily apparent and well within the grasp of those skilled in the art based on the disclosure herein The loader can perform a variety of functions that generally improve system security. In this example, the loader first checks its own integrity as shown by block 104. Integrity verification of software components can be accomplished by a variety of methods that are known in the art. For example the loader can utilize an integrity manifest to verify its own integrity as well as the integrity of other software components stored on the data carrier. The manifest is a set of information (contents and relocations) that identifies the software components being protected. More specifically, the manifest provides a description of the loader's critical components, signed with an asymmetric key. Each software component can be verified by the loader to ensure that no unintended modifications are present.

If the loader integrity test passes, control is passed to block 106. In the alternative if the loader fails the integrity check, control is passed to block 118 where the appropriate error or warning message is produced. In this event, the user may need to initiate corrective action before the system can be safely used. The loader can also verify the integrity of the browser software components as shown by block 106. This is particularly useful in embodiments where the browser is located on a read-write portion of the data carrier. If the browser integrity test passes, control is passed to block 108. In the alternative if the browser fails the integrity check, control is passed to block 118 where the appropriate error or warning message is produced.

The loader can also verify the integrity of other data files stored on the data carrier as shown by block 108. Such data includes, client authentication data, add-on program data and the like. This is again particularly useful in embodiments where the data is located on a read-write portion of the data carrier. If the data integrity test passes, control is passed to block 110. In the alternative if the browser fails the integrity check, control is passed to block 118 where the appropriate error or warning message is produced. The loader can also check for the presence of key logging software as shown by block 110. If no key loggers are present (i.e., Pass), control is passed to block 112. In the alternative, if the key logger test fails, control is passed to block 118 where the appropriate error or warning message is produced. Assuming all of the software integrity checks and system checks pass, control is passed to block 112. The loader can then place hooks that prevent unintended screen captures from taking place. The loader then launches the browser in debug mode thereby utilizing the debug handle and preventing other programs from debugging the browser software components.

While the foregoing description and drawings represent the preferred embodiments of the present invention, it will be understood that various changes and modifications may be made without departing from the scope of the present invention.

What is claimed is:

1. A secure data communication system for use in connection with a potentially untrusted host computer comprising:
    a storage medium that is connectable with the potentially untrusted host computer;
    a hardened, stand alone, web browser stored on the storage medium; and
    client authentication data, wherein the browser uses the client authentication data to facilitate secure communications.

2. The system of claim 1 comprising a loader that performs a cryptographic integrity check of at least one file associated with the browser and launches the browser only if the file passes the integrity check.

3. The system of claim 1 wherein the client authentication data is stored on the storage medium.

4. The system of claim 3 comprising a loader that performs a cryptographic integrity check of at least a portion of the client authentication data and launches the browser only if the client authentication data passes the integrity check.

5. The system of claim 1 comprising add-on program data stored on the storage medium.

6. The system of claim 5 comprising a loader that performs a cryptographic integrity check of at least a portion of the add-on program data and launches the browser only if the add-on program data passes the integrity check.

7. The system of claim 1 comprising an input for receiving client authentication data.

8. The system of claim 1 wherein the storage medium comprises at least one of a USB Flash Drive and a CD.

9. The system of claim 1 wherein storage medium has at least a read only portion.

10. The system of claim 1 wherein storage medium has at least a read/write portion.

11. The system of claim 1 wherein storage medium comprises a read only portion and a read/write portion.

12. The system of claim 9 comprising a loader stored on the read only portion, wherein the loaded performs an integrity check of at least one file associated with the browser and launches the browser only if the file passes the integrity check.

13. The system of claim 9 wherein the browser is stored on the read only portion.

14. The system of claim 2 wherein the loader launches the web browser in debug mode.

15. The system of claim 1 wherein the client authentication data includes at least one digital certificate.

16. The system of claim 15 wherein the digital certificate is cryptographically signed.

17. The system of claim 1 wherein the web browser is hardened by limiting communication to a list of browsable addresses.

18. The system of claim 1 wherein the browser is hardened by forcing encrypted communication.

19. The system of claim 1 wherein the web browser is hardened by forcing mutual authentication.

20. The system of claim 1 wherein the web browser is hardened by preventing access to security related browser options.

21. A secure data communication method for use in connection with a potentially untrusted host computer comprising:
   providing a storage medium that is connectable with the potentially untrusted host computer;
   providing a hardened, stand alone, web browser stored on the storage medium; and
   providing client authentication data, wherein the web browser uses the client authentication data to facilitate secure communications.

22. The method of claim 21 comprising performing a cryptographic integrity check of at least one file associated with the web browser and launches the web browser only if the file passes the integrity check.

23. The method of claim 21 wherein the client authentication data is stored on the storage medium.

24. The method of claim 23 comprising performing a cryptographic integrity check of at least a portion of the client authentication data and launches the web browser only if the client authentication data passes the integrity check.

25. The method of claim 21 comprising add-on program data stored on the storage medium.

26. The method of claim 25 comprising performing a cryptographic integrity check of at least a portion of the add-on program data and launching the web browser only if the add-on program data passes the integrity check.

27. The method of claim 21 receiving client authentication data via the host computer.

28. The method of claim 21 wherein the storage medium comprises at least one of a USB Flash Drive and a CD.

29. The method of claim 21 wherein storage medium has at least a read only portion.

30. The method of claim 21 wherein storage medium has at least a read/write portion.

31. The method of claim 21 wherein storage medium comprises a read only portion and a read/write portion.

32. The method of claim 29 comprising a loader stored on the read only portion, wherein the loaded performs a cryptographic integrity check of at least one file associated with the web browser and launches the web browser only if the file passes the integrity check.

33. The method of claim 29 wherein the a cryptographic browser is stored on the read only portion.

34. The method of claim 22 comprising launching the web browser in debug mode.

35. The method of claim 21 wherein the client authentication data includes at least one digital certificate.

36. The method of claim 35 wherein the digital certificate is cryptographically signed.

37. The method of claim 21 wherein the web browser is hardened by limiting communication to a list of browsable addresses.

38. The method of claim 21 wherein the web browser is hardened by forcing encrypted communication.

39. The method of claim 21 wherein the web browser is hardened by forcing mutual authentication.

40. The method of claim 21 wherein the web browser is hardened by preventing access to security related browser options.

41. A secure data communication system for use in connection with a potentially untrusted host computer comprising:
   a storage medium that is connectable with the potentially untrusted host computer, wherein the storage medium has at least a read only portion;
   a hardened, stand alone, web browser stored on the storage medium;
   a loader that performs an cryptographic integrity check of at least one file associated with the web browser and launches the web browser only if the file passes the integrity check, wherein the loader is stored on the read only portion of the storage medium; and
   client authentication data, wherein the web browser uses the client authentication data to facilitate secure communications.

* * * * *